United States Patent [19]
Stevens et al.

[11] Patent Number: 5,929,922
[45] Date of Patent: Jul. 27, 1999

[54] METHOD FOR BROADCASTING DIGITAL AUDIO OVER TELEVISION VERTICAL BLANKING INTERVALS

[75] Inventors: J. Clarke Stevens, Broomfield; Jason L. Ellis, Denver, both of Colo.

[73] Assignee: MediaOne Group, Inc., Englewood, Colo.

[21] Appl. No.: 08/948,103

[22] Filed: Oct. 9, 1997

[51] Int. Cl.$^6$ .................................................. H04N 7/087
[52] U.S. Cl. .......................................... 348/485; 348/478
[58] Field of Search ................................... 348/476, 478, 348/480–485, 12, 13, 6

[56] References Cited

U.S. PATENT DOCUMENTS

| | | | |
|---|---|---|---|
| 4,789,895 | 12/1988 | Mustafa et al. | 348/482 |
| 5,101,274 | 3/1992 | Yoshimura | 348/482 |
| 5,293,633 | 3/1994 | Robbins | 348/485 |
| 5,357,284 | 10/1994 | Todd | 348/482 |
| 5,585,858 | 12/1996 | Harpen et al. | 348/485 |

OTHER PUBLICATIONS

"Tell me about this WaveTop data broadcasting thing" at www.wavetop.net, date unknown, 2 pages.

"Intel Intercast™ Content Management Software (ICMS) Tool Set," at www.norpak.ca/icast.htm, date unknown, 6 pages.

CableSoft, "Use a proven, software–based technology that's ready to go . . . today and tomorrow," at www.cablesoft.com/products/index.html, date unknown, 1 page.

"RealSystem 5.0 Products, Complete streaming media solutions for the Internet and Intranets," at www.real.com/products/index.html, date unknown, 4 pages.

U S West, Inc., "AudioNet, The Broadcast Network on the Internet," at mol.advtech.uswest.com/, date unknown, 3 pages.

"VBI Datacasting," at www.ikmatex.com/e_ovbi.html, date unknown, 2 pages.

*Primary Examiner*—Victor R. Kostak
*Attorney, Agent, or Firm*—Holme Roberts & Owen

[57] ABSTRACT

A method and system for broadcasting digital audio signals is disclosed. In one embodiment, the method includes the steps of processing at least a first audio signal from a first audio source, inserting at least the first audio signal onto the vertical blanking intervals of at least a first television broadcast signal, and transmitting at least the first television broadcast signal having at least the first audio signal inserted therein to customers.

20 Claims, 6 Drawing Sheets

METHOD FOR BROADCASTING DIGITAL AUDIO OVER TELEVISION VERTICAL BLANKING INTERVALS

FIELD OF THE INVENTION

The present invention generally relates to a method and system for broadcasting radio signals, and in particular, relates to a method and system for broadcasting audio signals over television vertical blanking intervals.

BACKGROUND OF THE INVENTION

Generally, radio signals are broadcast from a radio station using frequency modulation ("FM") or amplitude modulation ("AM") type broadcast systems. Further, radio signals from a specific radio station are broadcast within a specified range of radio frequencies occupied by a modulated carrier wave. Listeners within the transmittance range of a specific radio station can receive radio signals by utilizing an appropriate FM or AM radio, depending upon the broadcasting system utilized by the specific radio station. As such, only listeners within a certain geographical area are typically able to receive and listen to a specific radio station. In this regard, a listener on the East Coast wishing to listen to a radio broadcast of, for example, a college football game occurring on the West Coast may not be able to listen to the game if only a local radio station on the West Coast is broadcasting the game, largely due to the limited geographic scope of the broadcast signal, be it an AM or FM signal.

SUMMARY OF THE INVENTION

Accordingly, it is an object of the present invention to provide a system and method for broadcasting a radio signal beyond its normal geographic transmittal extent.

It is yet another object of the present invention to provide a system and method for transmitting a plurality of radio signals, whereby a customer can receive any of the plurality of radio signals regardless of location of the customer relative to the radio stations from which the plurality of radio signals originate.

The present invention achieves one or both of the objectives of the present invention by providing a method and system for broadcasting radio signals. Generally, the method includes the steps of receiving at a first television station broadcast facility at least a first of a plurality of digitized audio signals, the plurality of digitized audio signals corresponding to analog radio signals originating from a plurality of radio stations, inserting into at least a first of a plurality of vertical blanking intervals of a first television broadcast signal to be transmitted from the first television station broadcast facility at least the first of the plurality of digitized audio signals, and broadcasting the first television broadcast signal having at least the first of the plurality of digitized audio signals inserted therein. As a result, the present invention ameliorates the problem of limited bandwidth available for bandwidth-limited content and allows an effective use of an existing broadcasting resource. In one embodiment of the present invention, a vertical blanking interval digital insertion system is utilized to achieve insertion of at least the first digitized audio signal into at least the first of the plurality of vertical blanking intervals of one or more television channels being broadcast.

In one embodiment of the method of the present invention, the step of inserting at least the first of the plurality of digitized audio signals into at least a first of the plurality of vertical blanking intervals of a first television broadcast signal includes the step of multiplexing at least the first of the plurality of digitized audio signals onto at least the first of the plurality of vertical blanking intervals of the first television broadcast signal. Such inserting step may also include the step of multiplexing at least the first and a second of the plurality of digitized audio signals onto at least the first of the plurality of vertical blanking intervals of the first television broadcast signal.

In another embodiment, for purposes of facilitating and/or enhancing the transmission and/or receivability of the digitized audio signal with customer premises equipment, the method may further include the step of encoding at least the first of the plurality of digitized audio signals to produce a first encoded audio signal. Such encoding may be conducted prior to the inserting step, such that at least a first encoded audio signal is inserted into at least the first of the plurality of vertical blanking intervals of the first television broadcast signal, or, alternatively, the encoding step may be integrated with the multiplexing step, such that encoding and multiplexing of at least the first digitized audio signal is accomplished by a vertical blanking interval digital insertion system. The method may further include the step of decoding the encoded audio signal with customer premises equipment.

In instances where a radio signal to be broadcast in accord with the present invention is an analog audio signal emanating from a radio station, the method of the present invention may also include the step of digitizing at least a first of a plurality of analog audio signals. In one embodiment, the digitizing step includes digitizing at least the first analog audio signal into the first digitized audio signal having a plurality of packets corresponding to, for example, at least a portion of the content of the first analog audio signal and/or an identifier for the first radio station from which the first analog audio signal emanates.

The step of broadcasting the first television broadcast signal having at least the first digitized audio signal inserted therein may include the step of transmitting at least the first television broadcast signal from the first television broadcast facility over the airwaves and/or via cable (e.g., cable television network) for receipt/reception of such by a customer (e.g., at home, business, etc.).

In another embodiment, the method may include the step of correcting transmission errors. Such correction may be accomplished by transmitting at least the first digitized audio signal in an error-correcting format, or alternatively, by transmitting the packets which comprise at least the first digitized audio signal more than once.

In another aspect of the present invention, a system for broadcasting at least a first audio signal from at least a first television broadcast facility is disclosed. In one embodiment, the system includes a vertical blanking interval digital inserter for multiplexing at least a first of a plurality of digitized audio signals onto at least a first of a plurality of vertical blanking intervals of at least a first television broadcast signal, and a transmitter, in electrical communication with the vertical blanking interval digital inserter, for transmitting at least the first television signal, the first television signal having at least the first of the plurality of digitized audio signals inserted onto the first of the plurality of vertical blanking intervals.

In another embodiment, the system may further include a digitizer. Such a digitizer is especially useful in instances where at least a first audio radio signal received from a first radio station is analog. In yet another embodiment, the system may also include a distribution server, which is adapted to receive at least the first of the plurality of digitized audio signals from the digitizer. Such distribution server is capable of feeding at least the first of the plurality of digitized audio signals to a first receiver at one or more television broadcast facilities.

In another embodiment, the system further includes customer premises equipment for extracting at least the first audio signal from the television broadcast signal to enable a customer to thereby listen to the audio broadcast which originated from the first radio station.

DETAILED DESCRIPTION OF THE INVENTION

FIGS. 1–6 illustrate the various features of the method and system of the present invention. Generally, the method of the present invention is directed to broadcasting audio (e.g., radio) signals beyond their normal geographic range. Specifically, and with reference to FIG. 1, the method of the present invention includes the steps of processing at least a first audio signal, inserting at least the first audio into at least a first of a plurality of television vertical blanking intervals of a single television channel of at least a first television broadcast signal and broadcasting the first television broadcast signal having at least the first audio signal inserted therein, the first television broadcast signal being receivable by customers. In one embodiment, the broadcast step includes the step of transmitting the first television broadcast signal having the first audio signal inserted therein via a cable television network and/or over the air waves. In instances where the first audio signal originates from a first radio station, the method of the present invention thus allows the first audio signal to be received by customers otherwise unable to receive the first audio signal.

Figure 1:
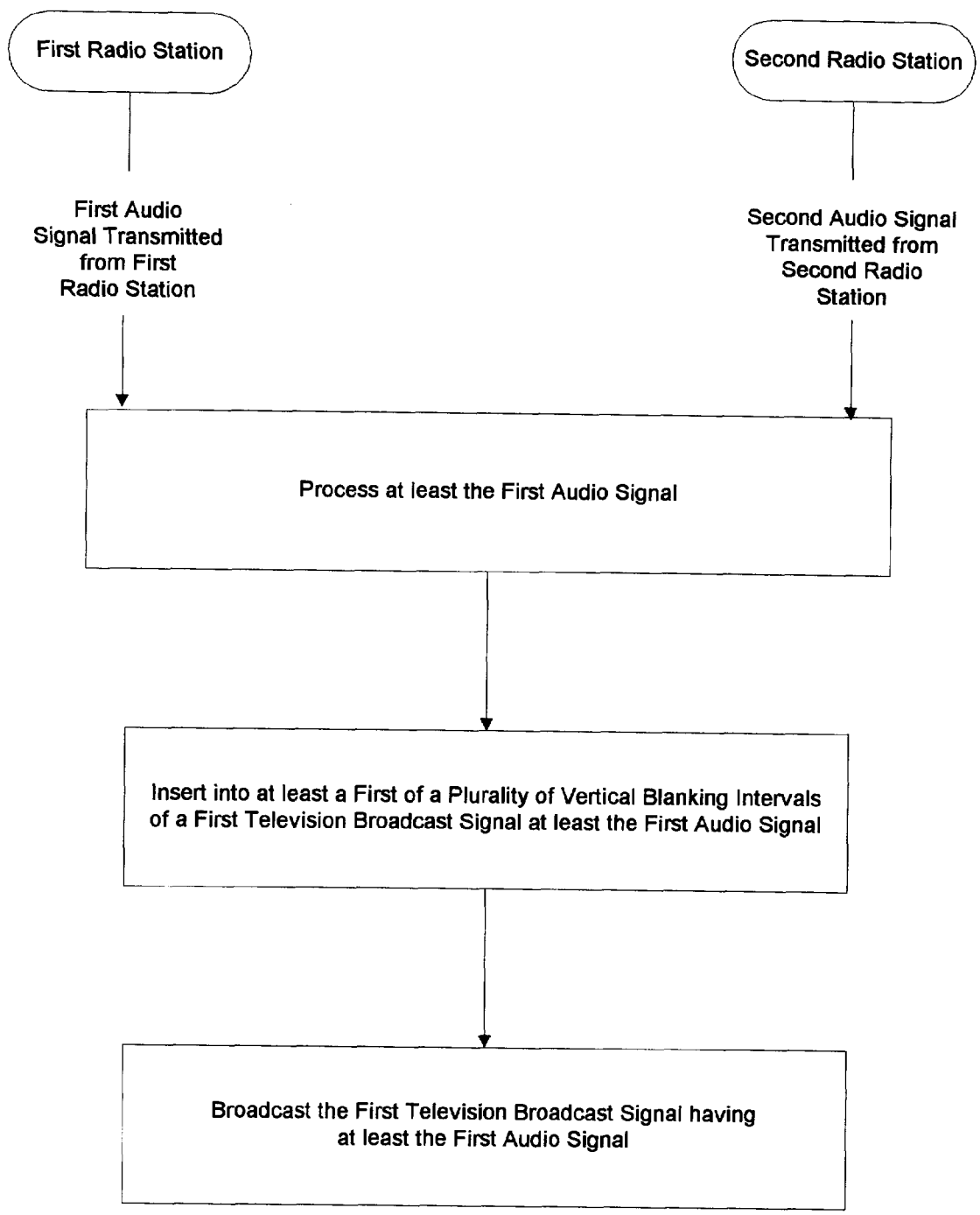
FIG. 1 is a flow chart of one embodiment of the method of the present invention.
Figure 2:
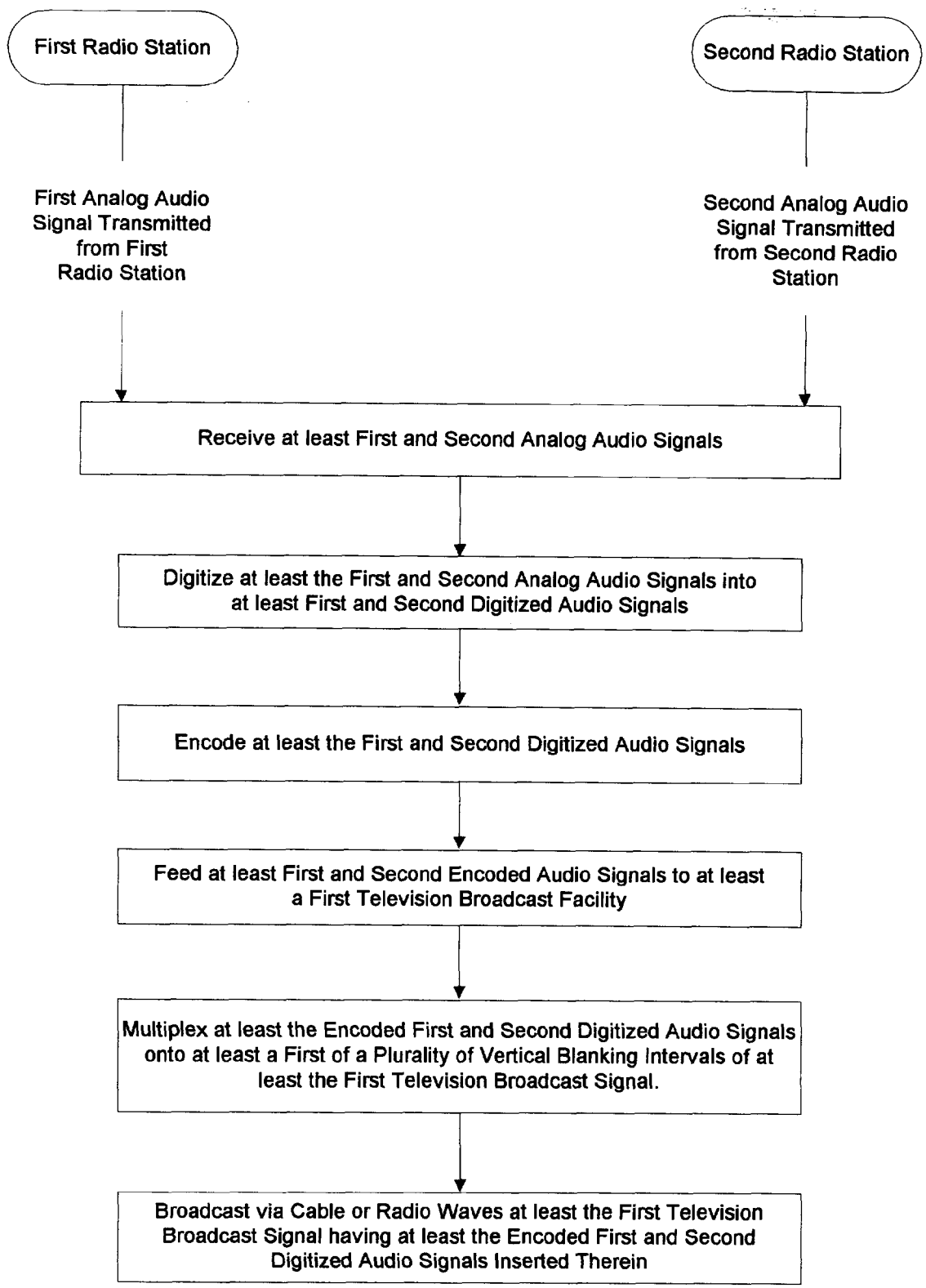
FIG. 2 is a flow chart of another embodiment of the method of the present invention.

For purposes of providing an audio signal capable of being inserted into at least a first television vertical blanking interval, the step of processing at least the first audio signal includes the step of receiving at least the first audio signal from, for example, a first radio station, as shown in FIG. 2. In instances where it is desirable to offer customers more than a single audio signal to which to listen, the receiving step also includes receiving at least a second audio signal from, for example, a second radio station, different than the first radio station. These audio signals from the first and/or second radio stations or other audio sources may be received by a computer via either a direct feed from a radio station (e.g., wire) or over the air.

The processing step further includes the step of digitizing at least the first and/or second audio signals upon receipt from the first and second radio stations or other sources, as illustrated in FIG. 2. Digitizing at least the first and second audio signals allows a number of audio signals (e.g., up to 45 channels of FM quality audio) to be broadcast over the vertical blanking interval of a single television channel using compression technologies. The step of digitizing the audio signals may be accomplished by using an audio digitizer, which is commercially available from various sources.

For purposes of facilitating and/or enhancing transmission of the audio signals, the processing step further includes the step of encoding the audio signals into at least one of a plurality of digital audio formats (e.g., AIFF, mu-law, RealAudio). In one embodiment, the step of encoding the audio signals occurs after the audio signals are digitized, and prior to inserting the audio signals into the television vertical blanking intervals, as illustrated in FIG. 2.

In one embodiment, illustrated in FIG. 2, the method of the present invention further includes distributing or feeding at least the first and second encoded audio signals to each television broadcast facility. For example, the first and second encoded audio signals may be fed via dedicated connections or even standard telephone land lines to distribution servers, which then feed at least the first and second audio signals to each television broadcast facility (e.g., first and second television broadcast stations) via dedicated network connections, such as the Internet, cable modem, T1 lines, asymetric digital subscriber lines, etc.).

As indicated above, the method of the present invention includes the step of inserting at least the first audio signal onto at least the first television vertical blanking interval of at least a first channel broadcast by a first television station. In one embodiment, illustrated in FIG. 2, where at least first and second encoded audio signals are received at at least a first television broadcast facility broadcasting at least a first television broadcast signal corresponding to a single television channel, the inserting step includes multiplexing at least the first and second encoded audio signal onto at least a first of a plurality of television vertical blanking intervals of at least the first television broadcast signal. Such multiplexing may be repeated to provide digital streaming of at least the first and second encoded audio signals over the vertical blanking intervals of one or more television broadcast signals. A vertical blanking interval inserter, which is commercially available from various vendors, may be utilized to accomplish this step.

Subsequent to such insertion of the audio signals onto the vertical blanking intervals, the method includes the step of broadcasting at least the first television broadcast signal having at least the first audio signal inserted therein from a television broadcast facility to customers. As illustrated in FIG. 2, the first television broadcast signal having at least the first audio signal inserted therein can be transmitted to customers via a cable television network and/or over the air waves.

Figure 3:
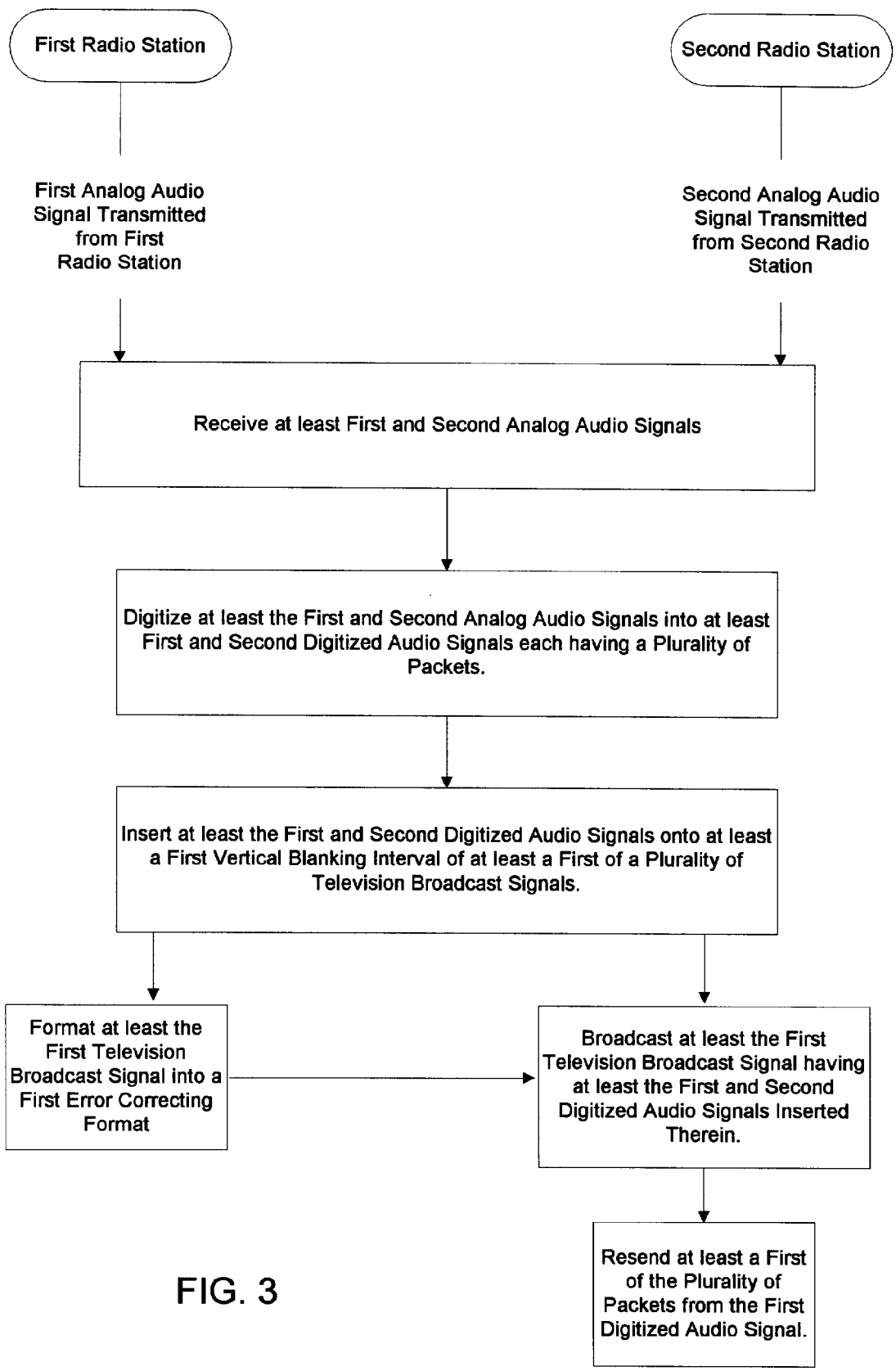
FIG. 3 is a flow chart of yet another embodiment of the method of the present invention.

In another embodiment, for purposes of alleviating problems associated with transmission errors, the method of the present invention also includes at least one of the steps of formatting at least the first television broadcast signal having at least the first audio signal inserted therein into a first error correcting format and sending packets corresponding to at least the first audio signal more than once, as illustrated in FIG. 3. In particular, the digital stream inserted into the vertical blanking intervals of at least the first television broadcast signal which correspond to the first audio signal can be sent in an error-correcting format, such as Reed-Solomon block encoding. This technique allows the user-end equipment (e.g., customer premises equipment) to detect and correct a certain percentage of errors. The block size and other parameters can be adjusted to ensure that the bit error rate is extremely small. For additional error reduction, packets corresponding to the first audio signal can be sent more than once in anticipation that there will be occasional errors even with the error-correcting technique.

Figure 4:
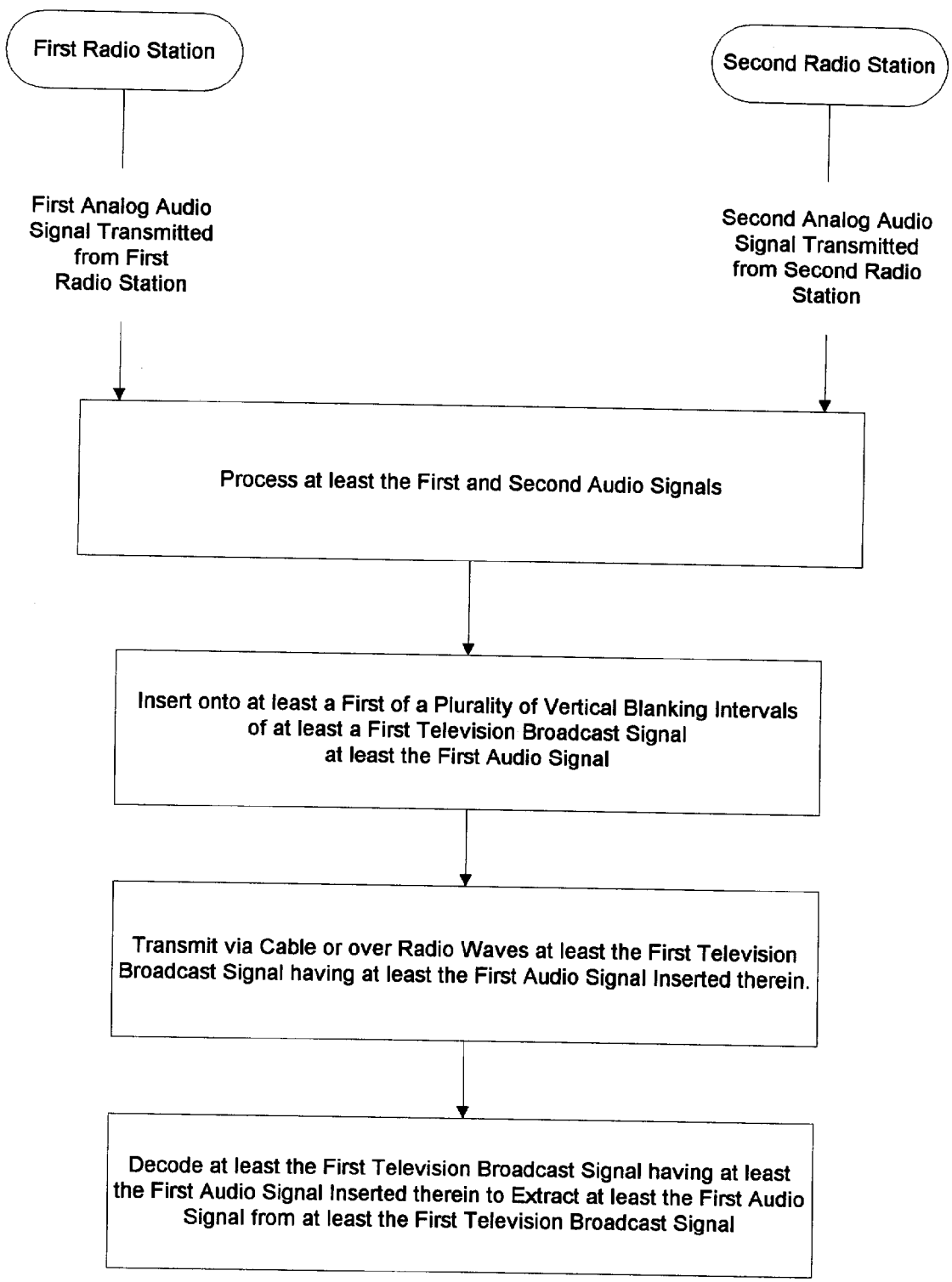
FIG. 4 is a flow chart of another embodiment of the method of the present invention.

FIG. 4 illustrates another embodiment of the method of the present invention. The method includes the steps of processing at least the first and second audio signals received from first and second audio sources (e.g., first and second radio stations), inserting at least the first audio signal onto at least a first of a plurality of vertical blanking intervals of at least a first television broadcast signal, transmitting at least the first television broadcast signal having at least the first audio signal inserted therein, and decoding at least the first television broadcast signal to extract at least the first audio signal from the first television broadcast signal. Decoding the first television broadcast signal allows a customer utilizing customer premises equipment (to be described in more detail hereinbelow) to listen to at least the first audio signal, independent of the first television broadcast signal.

Figure 5:
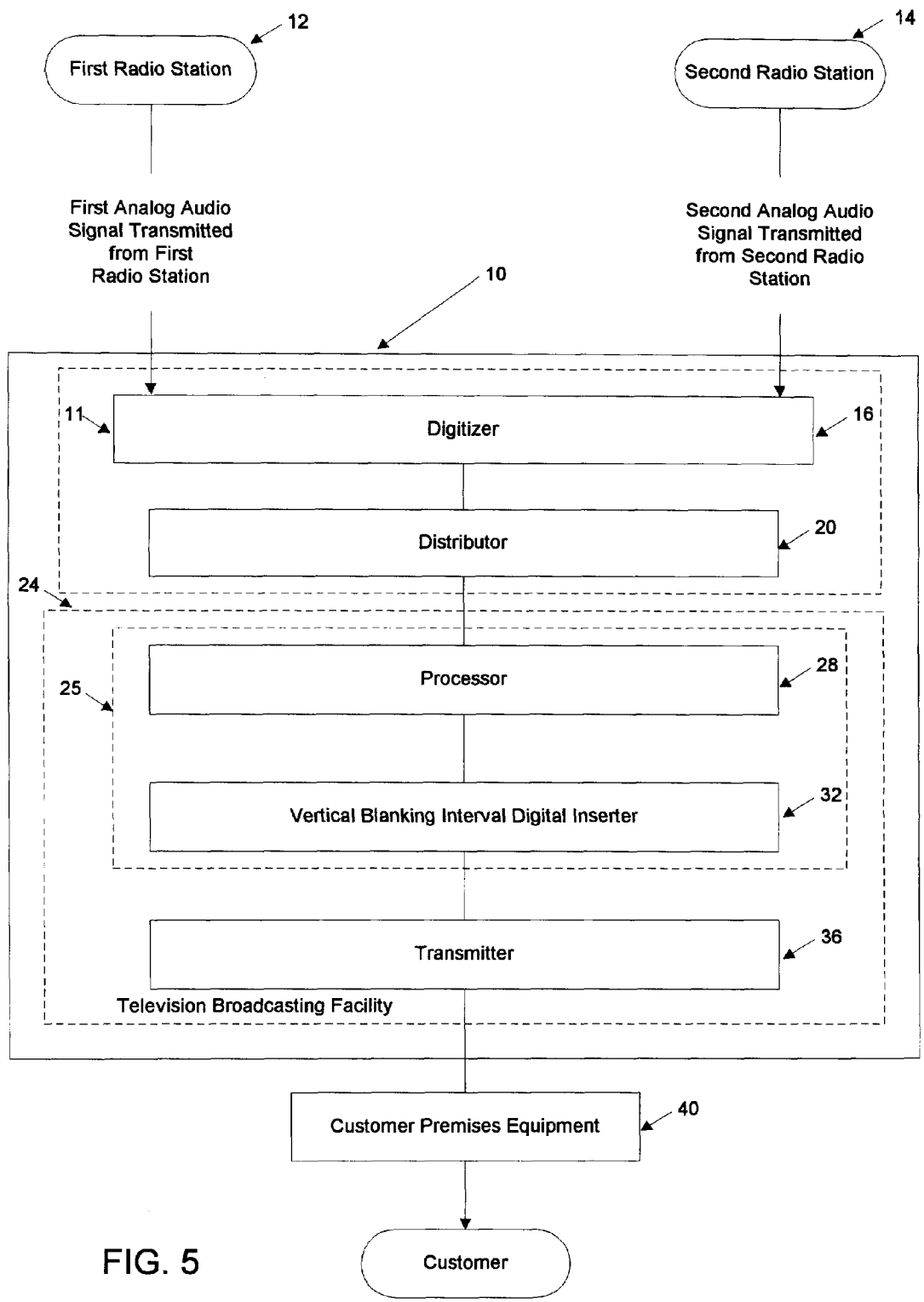
FIG. 5 shows a diagrammatic illustration of one embodiment of the system of the present invention.
Figure 6:
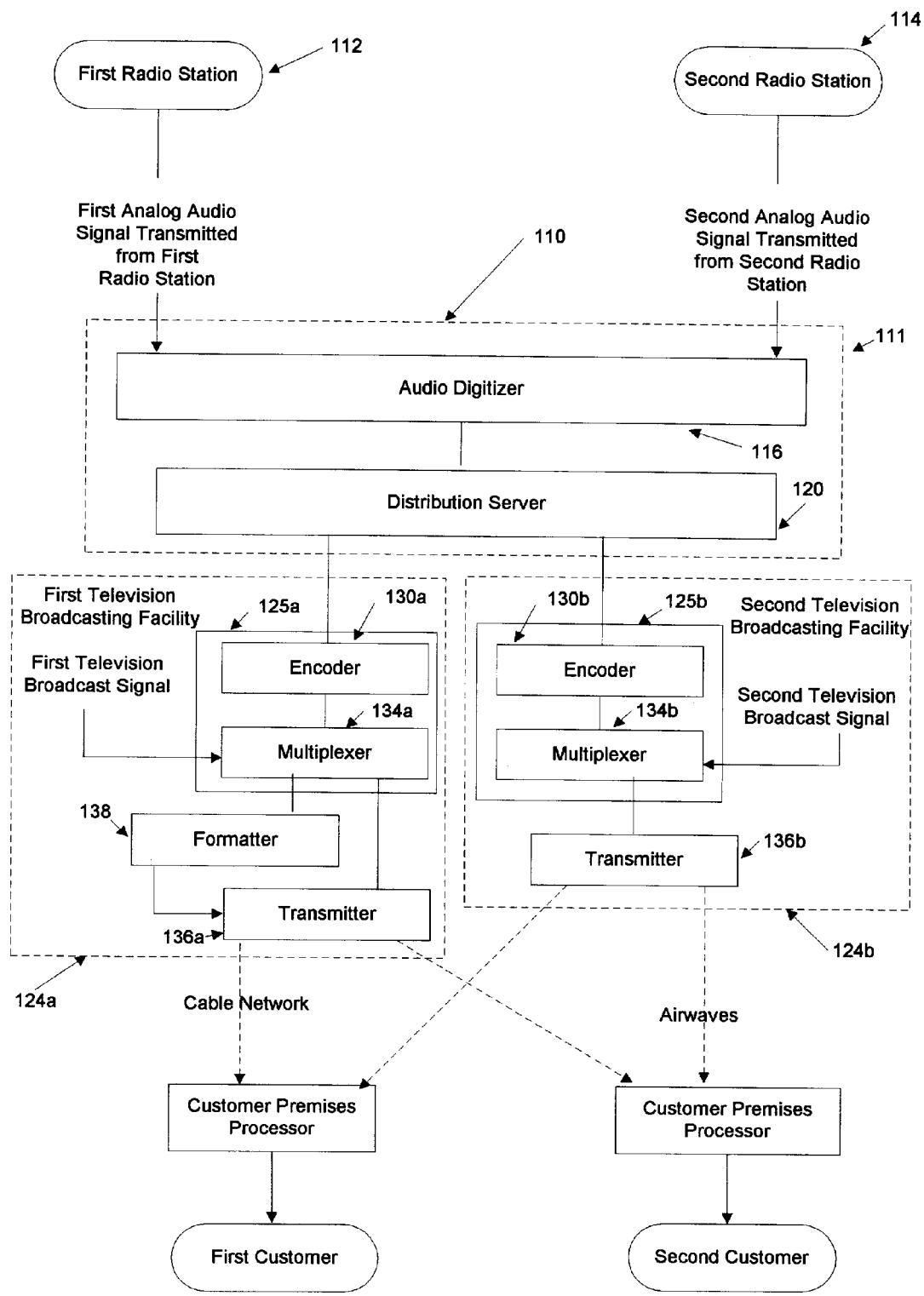
FIG. 6 shows a diagrammatic illustration of another embodiment of the system of the present invention.

In another aspect, illustrated in FIGS. 5 and 6, the present invention includes a system for broadcasting audio signals over vertical blanking intervals of a television broadcast signal. Generally, the system 10 of the present invention includes a content distribution system 11 for transporting the audio signals from the audio sources to key distribution points and a headend system 25, which communicates with a network, such as a television broadcast station or cable television network to broadcast the audio signal to customers. In one embodiment, the content distribution system 11 includes a digitizer 16 for digitizing analog audio signals (e.g., first and second analog audio signals) received from first and second audio sources 12, 14 (e.g., first and second radio stations) and a distributor 20 for feeding at least the first and second digitized audio signals to one or more television broadcast facilities, such as the first television broadcast facility 24. The headend system 25 includes a processor 28 for encoding at least the first and second digital audio signals and a vertical blanking interval digital inserter 32 for inserting at least the first and second digitized and encoded audio signals onto at least the first of a plurality of vertical blanking intervals of the first television broadcast signal to be transmitted by a transmitter 36 from the first television station 24. Such components combine to provide a digital streaming audio service over the vertical blanking interval of a television broadcast.

In one embodiment, illustrated in FIG. 5, the distribution system 11 is a computer having an audio digitizer 16, which receives analog audio signals from audio sources, such as the first and second radio stations 12, 14 and digitizes the received analog audio signals. Such audio digitizers are commercially available from a number of sources. The analog audio signals are typically received by the audio digitizer 16 via wire (e.g., a direct feed from an audio source) or over the air. In this embodiment, the digitizer 16 in the computer is connected to distribution servers, such as the distributor 20, by dedicated connections (e.g., wire, standard telephone lines). Such distributors 20 are capable of feeding the digitized audio signals corresponding to at least the first and second audio signals from the first and second radio stations 12, 14 to selected television broadcast facilities via dedicated network connections, such as cable, modem, T1, asymetric digital subscriber line, internet etc). Systems for distributing the digitized audio signals are commonly available from various vendors (e.g., Cisco Systems, Bay Networks, etc.).

The headend system 25, illustrated in FIG. 5, generally functions to combine the digitized audio signals with at least a first television broadcast signal. Such headend systems 24 are located at selected television broadcast facilities, such as the first television broadcast facility 24. In this regard, the headend system 25 includes a computer or processor 28 for receiving and processing the digitized audio signals from the distribution system 11. In one embodiment, the processor 28 encodes the various channels of digitized audio signals in at least one of a number of commonly utilized formats and then forwards the encoded audio signals to the vertical blanking interval digital inserter 32, which is capable of inserting the audio signals onto the vertical blanking intervals of a television signal. In this regard, upon receipt of the encoded audio signals, the vertical blanking interval digital inserter 32 multiplexes the audio signals onto the vertical blanking intervals of the television broadcast signal to be transmitted from the television station 24 by a standard transmitter 36. Such vertical blanking interval digital inserters are commercially available from Wavephore, Norpak and CableSoft.

For purposes of allowing customers to receive any of a number of audio signals in accordance with the features of the present invention, the system may further include customer premises equipment 40, which is remote from audio sources 12, 14, for extracting the audio information from the television signal. In one embodiment, the customer premises equipment includes a computer equipped with a vertical blanking interval decoding card, a sound card and appropriate software. In another embodiment, the customer premises equipment includes a set-top box or dedicated consumer audio component which would connect to the cable television network or antenna on input and a normal audio amplifier on output. In still another embodiment, the customer premises equipment may include a digital radio receiver capable of decoding the audio in the vertical blanking interval.

In another embodiment, illustrated in FIG. 6, a system 110 is provided for broadcasting audio signals over vertical blanking intervals of one or more television broadcast signals. Generally, the system 110 of the present invention includes a content distribution system 111 for transporting the audio signals from the audio sources to key distribution points and a headend systems 125a, 125b, each of which communicates with a network, such as first and second television broadcast stations 124a, 124b to broadcast the audio signal to customers.

In one embodiment, the content distribution system 111 includes a D/A converter or an audio digitizer 116 for digitizing analog audio signals from the first and second audio sources 112, 114. In this embodiment, the digitizer 116 is included in a receiver or computer which receives the audio signals, and which is connected to distribution servers, such as the distributor 120, by dedicated connections (e.g., wire, standard telephone lines). Such distributors 120 are capable of feeding the first and/or second digitized audio signals corresponding to at least the first and second audio signals from the first and second radio stations 112, 114 to either or both the first and second television broadcast facilities 124a, 124b via dedicated network connections, such as cable, modem, T1, ADSL, etc).

Independent headend systems 125a, 125b, illustrated in FIG. 6, function to combine at least the first and second digitized audio signals with the respective first and second television broadcast signals at the first and second television broadcast facilities 124a, 124b. Such headend systems 125a, 125b are located at the first and second television broadcast facilities 124a, 124b, respectively. In this regard, the headend systems 125a, 125b each includes an encoder 130a, 130b for receiving and encoding the various channels of digitized audio signals in at least one of a number of commonly utilized formats and then forwarding the encoded audio signals onto the respective vertical blanking interval digital inserter 132a, 132b, which is capable of inserting the audio signals onto the vertical blanking intervals of the respective station's television signal. In this regard, upon receipt of the encoded audio signals, each vertical blanking interval digital inserter has a multiplexer 134a, 134b for multiplexing the audio signals onto the vertical blanking intervals of the first and second television broadcast signals, respectively, to be transmitted from the television stations 124a, 124b by standard transmitters 136a, 136b. Such vertical blanking interval digital inserters are commercially available from Wavephore, Norpak and CableSoft. Further, and as illustrated in FIG. 6, such transmission of the television signals having the first and/or second audio signals inserted therein to customers for receipt by customer premises equipment is accomplished from the first and second television facilities 124a, 124b via a cable network and/or over the air waves.

As illustrated in FIG. 6, the system may further include components for alleviating problems associated with transmission errors. In this embodiment, the system of the present invention also includes a formatter 138 for formatting at least the first television broadcast signal having the first and/or second audio signals inserted therein into an error correcting format. In particular, the digital stream inserted into the vertical blanking intervals of at least the first television broadcast signal which correspond to the first and/or audio signals can be sent in an error-correcting format, such as Reed-Solomon block encoding. This allows the user-end equipment (e.g., customer premises equipment) to detect and correct a certain percentage of errors. The block size and other parameters can be adjusted to ensure that the bit error rate is extremely small. For additional error reduction, the transmitter 136a can send packets corresponding to the first audio signal more than one in anticipation that there will be occasional errors even with the error-correcting technique.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A method for broadcasting digital audio comprising the steps of:

processing at least a first of a plurality of audio signals, wherein the first of the plurality of audio signals relates to a first subject matter, the first subject matter corresponding to a first radio program;

inserting at least the first of the plurality of audio signals relating to the first subject matter into at least a first of a plurality of television vertical blanking intervals of a first television broadcast signal relating to a second subject matter, the first television broadcast signal transmittable from a first television broadcast facility, wherein the first subject matter of the first of the plurality of audio signals is different than the second subject matter of the first television broadcast signal, the second subject matter corresponding to a first television program unrelated to the first radio program; and broadcasting the first television broadcast signal having at least the first of the plurality of audio signals.

2. A method, as claimed in claim 1, further comprising the step of:

encoding at least the first of the plurality of audio signals to produce a first encoded audio signal.

3. A system, as claimed in claim 1, wherein said inserting step comprises the step of:

multiplexing at least the first of the plurality of audio signals onto at least the first of the plurality of television vertical blanking intervals of the first television broadcast signal.

4. A method, as claimed in claim 1, further comprising the step of:

encoding at least the first of the plurality of audio signals to produce at least a first encoded audio signal, wherein said inserting step comprises multiplexing at least the first encoded audio signal onto at least the first of the plurality of television vertical blanking intervals of the first television signal.

5. A method, as claimed in claim 1, wherein said processing step comprising the steps of:

receiving at least a first of a plurality of analog audio signals from at least a first of a plurality of radio stations; and digitizing at least the first of the plurality of analog audio signals from at least the first of the plurality of radio stations into a first of a plurality of digitized audio signals having a plurality of packets corresponding to the first of the plurality of analog audio signals.

6. A method, as claimed in claim 5, wherein the first of the plurality of digitized audio signals includes a plurality of packets, said broadcasting step comprising the step of transmitting at least a first of the plurality of packets within the first television signal.

7. A method, as claimed in claim 6, wherein said broadcasting step comprises the step of transmitting at least one of the plurality of packets more than once.

8. A method, as claimed in claim 1, further comprising the step of:

formatting at least the first television broadcast signal having at least the first of the plurality of audio signals into at least a first error correcting format.

9. A method, as claimed in claim 1, wherein said broadcasting step comprises at least one of the steps of:

transmitting at least the first television signal from the first television broadcast facility over radio waves; and transmitting at least the first television signal from the first television broadcast facility via cable.

10. A method for transmitting audio signals, comprising the steps of:

digitizing at least a first and a second of a plurality of analog audio signals relating to first and second subject matters from at least a first and second of a plurality of radio stations into first and second digitized audio signals relating to the first and second subject matters, respectively, wherein the first and second subject matters correspond to first and second radio programs, respectively;

receiving, at at least a first television broadcast facility, at least the first and second digitized audio signals;

encoding at least the first and second digitized audio signals;

multiplexing at lest the first and second digitized audio signals on to at least a first of a plurality of vertical blanking intervals of at least a first television broadcast signal relating to a third subject matter different than the first and second subject matters of the first and second digitized audio signals, wherein the third subject matter corresponds to a first television program unrelated to the first and second radio programs; and broadcasting from at least a first television broadcast facility at least the first television broadcast signal, wherein the first television broadcast signal includes at least the first and second digitized audio signals.

11. A method, as claimed in claim 10, further comprising, before said digitizing step, the step of:

receiving the first and second analog audio signals from the first and second radio stations.

12. A method, as claimed in claim 10, further comprising the steps of:

receiving, at at least a first distribution server, at least the first and second digitized audio signals; and feeding, from at least the first distribution server to at least the first television broadcast facility, at least the first and second digitized audio signals.

13. A method, as claimed in claim 10, further comprising the step of:

receiving, using customer premises equipment, at least the first television broadcast signal having at least the first and second digitized audio signals inserted therein.

14. A method, as claimed in claim 10, further comprising the step of:

decoding at least one of the first and second digitized audio signals in at least the first of the plurality of vertical blanking intervals of the first television broadcast signal.

15. A system for broadcasting audio signals from at least a first television broadcast facility comprising:

a vertical blanking interval digital inserter for multiplexing at least a first of a plurality of digitized audio signals relating to at least a corresponding first subject matter onto at least a first of a plurality of vertical blanking intervals of at least a first television broadcast signal relating to a second subject matter different than the first subject matter, wherein the first subject matter corresponds to a first radio program and the second subject matter corresponds to a first television program unrelated to the first radio program;

a transmitter, in electrical communication with said vertical blanking interval digital inserter, for transmitting at least said first television signal having at least said first digitized audio signals.

16. A system, as claimed in claim 15, further comprising:

a digitizer for receiving at least a first of a plurality of analog audio signals and for digitizing said first of said plurality of analog audio signals into said first of said plurality of digitized audio signals, said first of said plurality of said analog audio signals being receivable from a first radio station in radio communication with said digitizer.

17. A system, as claimed in claim 16, further comprising:

a distribution server adapted to receive at least said first of said plurality of digitized audio signals from said digitizer, wherein said distribution server is capable of feeding at least said first of said plurality of digitized audio signals to a first receiver, said first receiver being located at said first television broadcast facility.

18. A system, as claimed in claim 15, further comprising:

an encoder in electrical communication with said vertical blanking interval digital inserter, for encoding at least said first of said plurality of digitized audio signals into at least one of a plurality of audio formats.

19. A system, as claimed in claim 15, further comprising:

a decoder located at a customer premises, remote from said first television broadcast facility, for decoding at least said first of said plurality of digitized audio signals in at least said first of said plurality of vertical blanking intervals of said first television broadcast signal.

20. A method for transmitting audio signals, comprising the steps of:

digitizing at least a first and a second of a plurality of analog audio signals relating to first and second subject matters from at least a first and second of a plurality of radio stations into first and second digitized audio signals relating to the first and second subject matters, respectively;

receiving, at at least a first television broadcast facility, at least the first and second digitized audio signals;

encoding at least the first and second digitized audio signals;

multiplexing at least the first and second digitized audio signals onto at least a first of a plurality of vertical blanking intervals of at least a first television broadcast signal relating to a third subject matter different than the first and second subject matters of the first and second digitized audio signals; and broadcasting from at least the first television broadcast facility at least the first television broadcast signal, wherein the first television broadcast signal includes at least the first and second digitized audio signals, wherein at least the first radio station is geographically remote from the first television broadcast facility.

* * * * *

UNITED STATES PATENT AND TRADEMARK OFFICE
CERTIFICATE OF CORRECTION

PATENT NO. : 5,929,922
DATED : July 27, 1999
INVENTOR(S) : J. Clarke Stevens, et al.

It is certified that error appears in the above-identified patent and that said Letters Patent is hereby corrected as shown below:

On the title page, in item [73]:

In the second line after "Colo.", insert --and U S WEST, Inc., Denver, Colo. --

Signed and Sealed this

Eighth Day of August, 2000

*Attest:*

Q. TODD DICKINSON

*Attesting Officer*  *Director of Patents and Trademarks*